United States Patent [19]

White

[11] E Re. 30,952

[45] Reissued Jun. 1, 1982

[54] PERCUSSION DRILL BIT

[75] Inventor: Kenneth M. White, Calgary, Canada

[73] Assignee: Western Rock Bit Company Limited, Calgary, Canada

[21] Appl. No.: 49,968

[22] Filed: Jun. 19, 1979

Related U.S. Patent Documents

Reissue of:

[64] Patent No.: 4,051,912
Issued: Oct. 4, 1977
Appl. No.: 679,662
Filed: Apr. 23, 1976

[30] Foreign Application Priority Data

Feb. 3, 1976 [CA] Canada ..... 244910

[51] Int. Cl.[3] ..... E21B 10/56

[52] U.S. Cl. ..... 175/410; 175/415; 175/418; 299/10

[58] Field of Search ..... 175/409, 410, 417, 418, 175/412, 414, 415, 327; 173/128, 130, 132

[56] References Cited

U.S. PATENT DOCUMENTS

| | | | |
|---|---|---|---|
| Re. 16,061 | 5/1925 | Thurston | 175/409 |
| 1,995,043 | 3/1935 | Sanderson | 175/414 |
| 2,371,490 | 3/1945 | Williams, Jr. | 175/329 |
| 2,998,088 | 8/1961 | Pennington | 175/329 |
| 3,059,619 | 10/1962 | Beaumont | 175/92 X |
| 3,346,060 | 10/1967 | Beyer | 175/410 |
| 3,357,507 | 12/1967 | Stewart | 175/410 |
| 3,536,150 | 10/1970 | Stebley | 175/410 X |
| 3,640,355 | 2/1972 | Lebourg | 175/329 |
| 3,752,534 | 8/1973 | Rollins et al. | 299/10 |
| 4,043,409 | 8/1977 | Walter | 175/409 |

*Primary Examiner*—James A. Leppink
*Attorney, Agent, or Firm*—Wenderoth, Lind & Ponack

[57] ABSTRACT

A percussion drill bit has an anvil portion and a removable head portion incorporating cutting inserts arranged in circumferentially-spaced groups separated by fluid flow passageways, at least some of the inserts being arranged at axial and radial positions with respect to the drill axis so that during working operation these inserts penetrate the formation being drilled by generally equal amounts and are thus subject to generally the same loading. The removable head portion is retained on the anvil portion of the bit by a splined and threaded lock nut arranged so that the threads are not subjected to cyclical fatigue loading due to operation of the percussion force generating tool.

9 Claims, 12 Drawing Figures

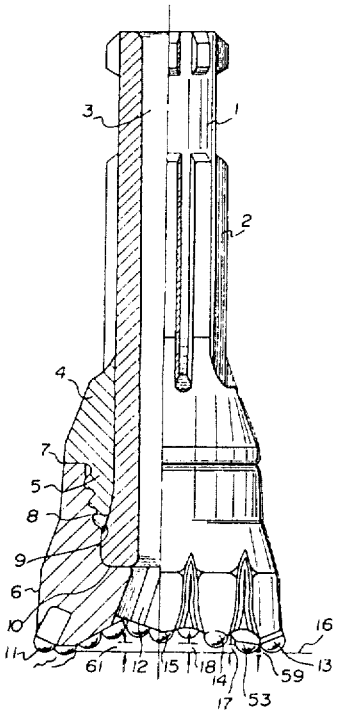
FIG. 1
FIG. 2
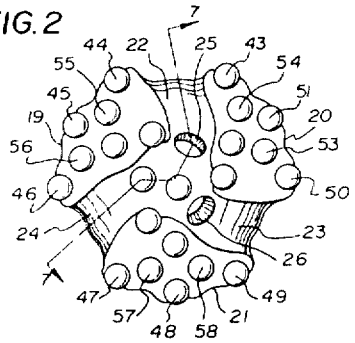
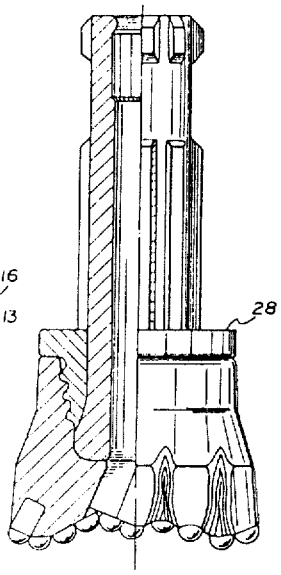
FIG. 3

PERCUSSION DRILL BIT

Matter enclosed in heavy brackets [ ] appears in the original patent but forms no part of this reissue specification; matter printed in italics indicates the additions made by reissue.

*This is a reissue application of U.S. Patent No. 4,051,912 which matured from Ser. No. 679,662 filed Oct. 4, 1977.*

BACKGROUND OF THE INVENTION

This invention relates to a drill bit used in percussion drilling and particularly percussion drilling in which a tool capable of exerting rapid percussive forces is mounted directly above the drill bit and is operated by a compressible fluid such as air or some other gas. The drill bit consists of an anvil portion and a head portion. As the percussive tool strikes the anvil on the bit, the assembly is rotated so that the cutting inserts, typically of a hard metal, such as tungsten carbide, are indexed to a new part of the formation being drilled upon each blow. The high frequency of percussive blows on the formation being drilled causes the formation to fail. The net penetration of each insert into the formation per blow is, however, very small and therefore the interrelationship between one insert and another becomes a critical factor.

Gage wear on percussion bits is a critical problem in that the inserts cutting on gage, that is the outer diameter of the hole being drilled, are required to remove the maximum material volume as well as being subjected to sliding abrasive wear as the bit indexes. The provision of a greater number of inserts on gage generally requires a reduction in the volume of support material retaining each insert or a reduction in the areas of the fluid (in particular, air) flow passages provided for cutting debris removal from the inner rows of inserts on the bit face. Reduction of the fluid flow passage area has the detrimental effect of increasing the back pressure on the percussion tool so that the impact force per blow is reduced, hence the penetration rate decreases. Increasing the number of inserts in the gage row while maintaining the fluid flow passageway area reduces the support material per insert so that fatigue failure of the support material generally results.

A typical known percussion bit is characterized by a high wear area and a low wear area because the anvil portion of the bit, being enclosed within the percussion tool casing, generally is not worn out or damaged at the same rate as the drilling head portion of the bit. Provision of a separate cutting and anvil portion with a threaded means of interconnection has not generally proven to be effective due to fatigue failure of the threads. The space available limits the physical thread size as well as the variations in retention methods that can be utilized while allowing 'in-field' separation of the head portion of the bit from the anvil portion.

SUMMARY OF THE INVENTION

The objectives of this invention are therefore to provide a percussion drill bit with separable head and anvil portions and enabling improved economies in use due to a more uniform loading of the gage and inner row inserts while still allowing for maximum fluid flow areas across the bit face.

According to the invention there is provided a percussion drill bit having an anvil portion and a head portion, with connecting means therebetween to transmit simultaneously torsional and axial percussive forces from said anvil portion to said head portion, a plurality of cutting inserts arranged on the cutting end of said head portion in a plurality of circumferentially-spaced groups separated by fluid flow passages, at least some of said inserts being arranged at axial and radial positions with respect to the drill axis whereby during drilling operations those inserts penetrate to formation being drilled by generally equal amounts and are thus subject to generally the same loading.

In a preferred embodiment corresponding sets of inserts, one set from each group, are at the same radial distance from the drill axis and successive inserts in one set, in the direction of rotation of the drill, are at progressively greater axial distances from the cutting end of the head portion and at the same axial distance as corresponding inserts in the other sets.

Desirably, said connecting means comprises a lock nut with an external thread to mate with a corresponding internal thread on the head portion, internal splines to mate with corresponding external splines on the anvil portion, torsional forces being transmitted through said splines and threads, and mating abutment surfaces on the anvil portion, lock nut and head portion, to transmit axial percussive forces without loading said threads. Conveniently, the mating abutment surfaces of said lock nut and head portion are used for preloading said mating threads to ensure a tight connection therebetween which will resist loosening under the action of said axial percussive forces transmitted through the anvil portion to the head portion and thus maintain said torsional load transmission.

BRIEF DESCRIPTION OF THE DRAWINGS

There follows a description of a particular embodiment of the invention, by way of example only with reference to the accompanying drawings, in which:

FIG. 1 is a side view in partial section of a percussion drill bit;

FIG. 2 is a plan view of the cutting end of a drill bit of the kind shown in FIG. 1;

FIG. 3 is a partially sectioned side view of a drill bit having a different type of anvil and preloading arrangement from the drill bit shown in FIG. 1;

DETAILED DESCRIPTION OF PREFERRED EMBODIMENTS

Figure 4A:
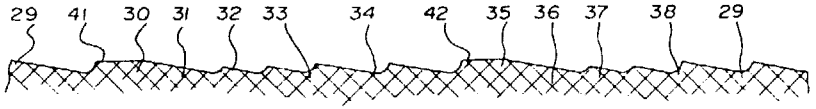
FIG. 4a shows graphically the progressive penetration of the gage row of carbide inserts of the prior art drill bit shown in FIG. 4.

The percussion bit shown in FIG. 1 has an anvil portion 1 with external longitudinal drive splines 2, and a fluid passageway 3. A lock nut 4 is externally threaded at 5 to co-act with similar internal threads on a head portion 6. Abutting shoulders at 7 transmit a preloading force to the mating threads to retain the lock nut 4 on the head portion 6. Internal splines on the lock nut 4 terminate at 8 and are similar to the drive splines 2 which terminate at 9, there being a clearance space provided between the spline terminations on the anvil portion 1 and the lock nut 4 when the lock nut 4 is fully tightened with the head portion 6. The splines on the lock nut 4 serve to transfer torsional force to the head portion 6 during indexing, while allowing impact forces from the percussion tool (not shown) to be transferred directly to the head portion 6 at surface 10. The clearance space formed between the termination of the splines at 8 and 9 can be filled with a compressible filler, so that the abutting anvil and head surfaces at 10 are pre-loaded to a certain extent upon abutment at 7 of the shoulders on the head portion 6 and the lock nut 4.

A multiplicity of tungsten carbide cutting inserts 11 are so arranged on the head portion 6 as to progressively fracture the formation being drilled. Fluid flow passageway 12 is typical of two such passageways that direct a flow of fluid, typically air or some other gas, from the percussion tool across the face of the head portion 6, so that the cutting debris is removed as it is regenerated by the inserts 11.

Inserts 13, 14, 15, for example, are classified as gage inserts and are the same radial distance from the axis of the percussion drill bit. They are not in the same plane transverse to the drill axis however, as is apparent from their position in relation to reference line 16 in FIG. 1. Thus, insert 14 is at a distance 17 and insert 15 is at a distance 18 from reference line 16.

Referring to the plan view of the cutting end of the head portion shown in FIG. 2 (with cutting inserts identified by different references from those used in FIG. 1), three similar groups of inserts 19, 20, 21 are separated by three fluid flow passages 22, 23, 24, supplied by two fluid flow passages 25, 26 which terminate internally on the drill axis at the center of the head portion 6. Some inserts in each group are mounted at the same radial distance from the drill axis so that a series of ridges are cut into the formation with each rotation of the bit head.

The percussion drill bit shown in FIG. 3 has a different preloading arrangement from the bit shown in FIG. 1, in that a flat face 28 is used to transmit the preloading instead of the splined face of the bit. Nevertheless, the basic construction of the lock nut, splines and head portion, is similar, in that the threads of the head portion and lock nut are not subjected to percussive forces transmitted through the drill.

Figure 4:
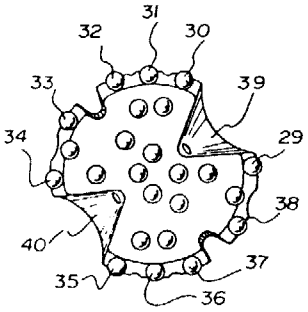
FIG. 4 is a plan view of the cutting structure of a prior art drill bit.

Referring to the plan view of a prior art type of percussion bit shown in FIG. 4, gage row inserts 29 through 38 are inclined with respect to the drill axis, as is common practice, but are in the same plane (transverse to the drill axis) relative to the formation being drilled. Air flow relief passageways are provided at 39 and 40. The remainder of the inserts are in the same plane, again transverse to the drill axis, but which is generally a small distance below the plane of the gage inserts.

FIG. 4a graphically represents the cutting action of the prior art bit shown in FIG. 4 as a 'fracture profile', that is as if the circumference of the hole at the gage insert radius were developed into a straight line. The inserts 29 through 38 are shown referenced in a position at the start of drilling. In the time interval involved in the representation, insert 33 traverses the circumferential distance to the position of insert 34. This particular type of bit has a large spacing between inserts 29, 30 and 34, 35 which leaves a portion of the hole bottom uncut at 41 and 42 when the remainder of the inserts have completely traversed the insert interspacing distance. The net result is that inserts 29 and 34 are subjected to a higher loading than the remainder of the gage row inserts. It can be seen from FIG. 4a that inserts 30, 31, 32 and 35, 36, 37 are the least loaded inserts, and that inserts 33 and 38 have the second highest loading. In a drill bit of this configuration the insert wear is highest on the lead inserts 29 and 34, and decreases for the remainder of the inserts. This prior art drill bit does however make provision for large air relief passageways to reduce the back pressure on the drilling tool.

Figure 5:
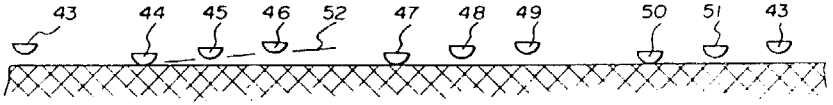
FIGS. 5, 5a and 5b together show the progressive penetration of the outer or gage row of carbide inserts of the percussion bit shown in FIG. 1.

From the plan view of a cutting structure according to the invention, as shown in FIG. 2, it can be seen that inserts 43 to 51 are arranged to fail the outer periphery or gage of the hole, the interspacing between these inserts being equal. FIG. 5 shows the resultant fracture profile for the same rotary speed and penetration rate used for the prior art drill of FIG. 4 in forming the fracture profile of FIG. 4a.

In FIG. 5 the first gage row inserts to come into contact with the formation being drilled are 44, 47 and 50, also shown in FIG. 2. The slope line 52 is identical for the three groups of inserts 19, 20 and 21 and is determined from the drill rotary speed and penetration rate. This slope line 52 is such that the gage row insert penetration is constant for all the inserts for a given penetration rate and rotary speed. It is possible to provide a constant gage row insert penetration by havig equiangular spacing between the gage row inserts. This however, would not allow for large fluid flow passages at the outside circumference of the bit, and therefore the drilling tool would operate wih higher back pressures.

Figure 5A:
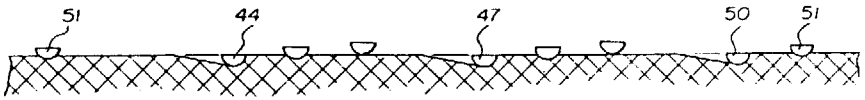
Figure 5B:
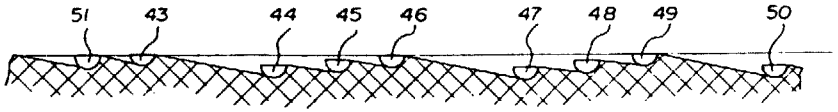

FIGS. 5a and 5b show successive stages in the drill penetration, for the gage row inserts.

Figure 6:
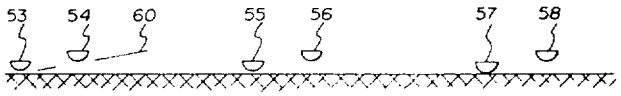
FIGS. 6, 6a and 6b together show the progressive penetration of the carbide inserts in the row adjacent and inside the gage row, of the percussion drill bit shown in FIG. 1.

The second row of inserts, progressing inwardly from the outer gage row, has only six inserts as opposed to the nine gage inserts shown in FIG. 2, but has a larger slope angle, as shown by line 60 in the fracture profile of FIG. 6. Insert 53 is shown in FIG. 1 as below reference line 16 by distance 59, so that the three inserts of the second row typified by 53 precede all other inserts into formation being drilled. FIG. 6 shows the second row inserts at the commencement of drilling with inserts 53, 55 and 57 starting to engage the formation, but gage inserts 44, 47 and 50 not yet in contact with the formation, since the second row inserts preceed them by the distance 59 shown in FIG. 1.

Figure 6A:
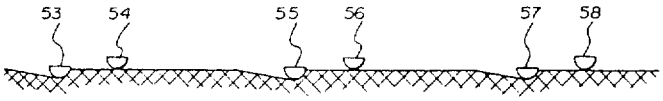
Figure 6B:
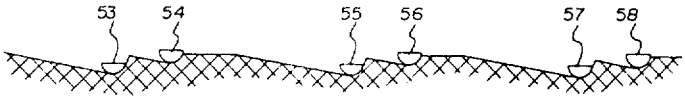

FIGS. 6a and 6b show successive stages in the drill penetration, for the second row inserts.

The third and fourth rows of inserts each comprise three inserts arranged in an equiangular manner so that each insert has the same penetration into the formation being drilled. The inserts in these two rows are in different planes transverse to the drill axis, but the three inserts in each row are in the same plane. The third row of inserts is substantially in the same plane as the lowest gage row insert and the fourth row is elevated by distance 61, as shown in FIG. 1. The positioning of the inner rows serves to provide lateral stability for the bit when drilling, as well as generating preferred zones of tensile failure. This is accomplished with the sacrifice of pure compressive loading on the inserts.

The innermost two rows of inserts fracture the central portion of the hole being formed and generally do not cause a wear or loading problem due to the minimal volume of material removed. There is a point of inflection on the bit face between the fourth and fifth rows of inserts so that a readily fractured upstanding rib is formed in the formation between these rows.

Figure 7:
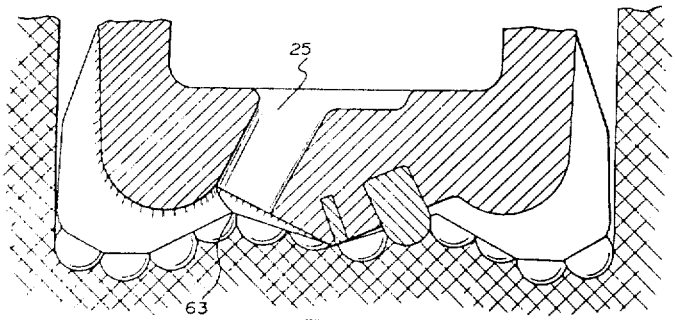
FIG. 7 shows an enlarged sectional view along line 7—7 of FIG. 2.

The fluid, in this case air, flow passageways and the profile of the hole drilled in the formation are shown in FIG. 7, which is a section on line 7—7 on FIG. 2. Passageway 25 is identical to passageway 26 shown in FIG. 2 and is directed such that the center of the mouth of the passageway is substantially at the apex of the inflection point on the bit face at 63. Face passageway 24 shown in FIG. 2 does not have an air flow passageway from the axial passageway 3 to the face, in order to provide an unbalanced air flow from the drill apex to the drill gage for air travelling from holes 25 and 26.

In practice, the drillability of the various formations will affect the slope angle and the insert inclination to the drill axis. The number of groups of inserts, three in the foregoing example, could be varied from two or more while still incorporating the insert arrangement according to the invention. The number of rows of inserts will necessarily vary with the particular bit size, as will the physical size of the bit head. The lock nut for retaining the bit head to the anvil portion of the assembly could be split for certain sizes and types of bits and modified for various internal spline sizes and types, without departing from the invention. The insert arrangement according to the invention could be utilized on a solid head percussion bit, that is without a removable head portion.

What I claim as my invention is:

1. A percussion drill bit having an anvil portion and a head portion, with connecting means therebetween to transmit torsional and percussive axial forces from said anvil portion to said head portion, a plurality of cutting inserts arranged on the cutting end of said head portion in a plurality of circumferentially-spaced groups, said cutting end having fluid flow passages thereacross separating said groups of inserts, at least some of said inserts being so arranged that during drilling operations said some of said inserts penetrate the formation being drilled by generally equal amounts and are thus subject to generally the same loading, corresponding sets of inserts, one set from each group, being at the same radial distance from the drill axis, and successive inserts in one set, in the direction of rotation of the drill, being at progressively lesser axial distances from a reference plane transverse to the axis at the lowermost end of the head portion, and at the same axial distance from said reference plane as corresponding inserts in the other sets, the spacing between inserts in each set being substantially uniform, and, *in the radially outer part of said cutting end,* the outermost of any radially adjacent pair of sets having a greater number of inserts than the innermost of said pair.

2. A percussion drill bit, as claimed in claim 1, in which there are different numbers of inserts in all said sets within each group.

3. A percussion drill bit, as claimed in claim 1, in which there are equal numbers of inserts in corresponding sets.

4. A percussion drill bit, as claimed in claim 1, in which successive radially-spaced sets of inserts are at different spacings from the reference plane whereby there is produced a series of radially-spaced ridges during drilling operations.

5. A percussion drill bit, as claimed in claim 4, in which the inserts in a radially inner set have an axial spacing with respect to the reference plane greater than the axial spacing of the inserts in a radially outer set.

6. A percussion drill bit, as claimed in claim 1, in which said connecting means comprises a lock nut with an external thread to mate with a corresponding internal thread on the head portion, internal splines to mate with corresponding external splines on the anvil portion, torsional forces being transmitted through said splines, and mating abutment surfaces on the anvil portion and head portion, to transmit axial percussive forces without loading said threads.

7. A percussion drill bit, as claimed in claim 6, in which said lock nut and head portion have mating abutment surfaces therebetween for preloading said mating threads to ensure a light connection therebetween.

*8. A percussion drill bit having an anvil portion and a head portion having a plurality of cutting inserts arranged on the cutting end thereof, and connecting means therebetween to transmit simultaneously torsional and percussive axial forces from said anvil portion to said head portion, said connecting means comprising a lock nut with an external thread mating with a corresponding internal thread on the head portion, internal splines mating directly with corresponding external splines on the anvil portion, torsional forces being transmitted through said splines, and directly mating abutment surfaces on the anvil portion and head portion, to transmit axial percussive forces without loading said threads, said lock nut when fully threaded into said head portion holding said mating abutment surfaces on the anvil portion and head portion together.*

*9. A percussion drill bit, as claimed in claim 8, in which said lock nut and head portion have mating abutment surfaces therebetween for preloading said mating threads to ensure a tight connection therebetween.*

* * * * *